US012744714B2

(12) United States Patent
Shakya et al.

(10) Patent No.: US 12,744,714 B2
(45) Date of Patent: Sep. 22, 2026

(54) EFFICIENT NETWORK TRAFFIC CLASSIFICATION USING DETERMINISTIC FINITE AUTOMATA

(71) Applicant: Samsung Electronics Co., Ltd., Suwon-si (KR)

(72) Inventors: Virendra Shakya, San Francisco, CA (US); Vignesh Saravanaperumal, San Jose, CA (US); Sanjay Patil, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 18/946,401

(22) Filed: Nov. 13, 2024

(65) Prior Publication Data

US 2025/0233810 A1 Jul. 17, 2025

Related U.S. Application Data

(60) Provisional application No. 63/621,251, filed on Jan. 16, 2024.

(51) Int. Cl.
*H04L 43/04* (2022.01)
*H04L 47/70* (2022.01)

(52) U.S. Cl.
CPC .............. *H04L 43/04* (2013.01); *H04L 47/70* (2013.01)

(58) Field of Classification Search
CPC ................................ H04L 43/04; H04L 47/70
See application file for complete search history.

(56) References Cited

U.S. PATENT DOCUMENTS 6,614,789 B1 9/2003 Yazdani
7,904,961 B2 * 3/2011 Ma ........................ G06F 21/552 726/22
8,321,440 B2 11/2012 Beylin
9,563,691 B2 2/2017 Chang
(Continued)

FOREIGN PATENT DOCUMENTS

CN 107612899 B * 8/2020
CN 111935182 A * 11/2020 ............. H04L 63/02
(Continued)

OTHER PUBLICATIONS

International Search Report and Written Opinion in International Application No. PCT/KR2024/020987, Apr. 1, 2025.

*Primary Examiner* — Jonathan A Bui

(57) ABSTRACT

In one embodiment, a method includes accessing a rule set for a group of networking assets; creating, based on the rule set, a primary automaton including a set of keys, each key including (1) a string identifying a network asset from the group of network assets (2) a separator character following the string and (3) a key branch number identifying a state. The method further includes creating, based on the rule set, one or more secondary automata by creating a secondary automaton for each type of result classification in the rule set; and for each secondary automaton, populating that secondary automaton with a set of values, each including (1) a value branch number identifying a state of that secondary automaton, each value branch number corresponding to a specific key branch number in the primary automaton, and (2) a string identifying a domain identified in the rule set.

20 Claims, 5 Drawing Sheets

(56) References Cited

U.S. PATENT DOCUMENTS

| | | | | |
|---|---|---|---|---|
| 11,632,303 | B2 | 4/2023 | Bitterfeld | |
| 2006/0195435 | A1 | 8/2006 | Laird-McConnell | |
| 2008/0263665 | A1 | 10/2008 | Ma | |
| 2012/0113857 | A1 | 5/2012 | Narayanaswamy | |
| 2013/0132322 | A1* | 5/2013 | Cohen | G06N 5/025 706/47 |
| 2013/0132325 | A1* | 5/2013 | Cohen | G06N 5/025 706/47 |
| 2014/0327672 | A1 | 11/2014 | Siebert | |
| 2021/0042442 | A1 | 2/2021 | Al-Kabra | |
| 2022/0279013 | A1* | 9/2022 | Qiu | H04L 63/1441 |

FOREIGN PATENT DOCUMENTS

| | | | |
|---|---|---|---|
| JP | 2003-229913 | A | 8/2003 |
| KR | 10-2010-0073135 | A | 7/2010 |
| KR | 2015-0013635 | A | 2/2015 |
| KR | 20150091209 | A | 8/2015 |
| KR | 1796529 | B1 | 11/2017 |
| KR | 20220064005 | A | 5/2022 |
| WO | WO07064685 | A2 | 6/2007 |

* cited by examiner

EFFICIENT NETWORK TRAFFIC CLASSIFICATION USING DETERMINISTIC FINITE AUTOMATA

PRIORITY CLAIM

This application claims the benefit under 35 U.S.C. § 119 of U.S. Provisional Patent Application No. 63/621,251 filed Jan. 16, 2024, which is incorporated by reference herein.

TECHNICAL FIELD

This application generally relates to efficient network traffic classification using deterministic finite automata.

BACKGROUND

Networking assets generate network traffic by passing data to and from other portions of the network. Networks can include local area networks and wide area networks, such as the internet. Networking assets include computing devices, including endpoints such as client devices like smartphones, personal computers, tablets, wearable devices, etc. Networking assets can also include specific software applications executed by network computing devices.

An administrator of a network often wants to create policies governing allowable network behavior for a group of networking assets controlled by the administrator. For example, a business entity may deploy network assets to employees or customers, or both, and may want to implement policies identifying which devices (or subset of devices) and which applications (or subset of applications) can take some networking action, such as accessing a particular domain, such as a website identified by a URL or a networked device identified by an IP address.

DESCRIPTION OF EXAMPLE EMBODIMENTS

An administrator of a network often wants to create policies governing allowable network behavior for a group of networking assets controlled by the administrator. For example, an IT administrator of a business entity may want to classify and filter network traffic on endpoints (e.g., client devices such as phones, laptops, tablets, etc.) managed by that entity. Filtering may include permitting or denying access to outside resources (e.g., external websites) or to internal resources (e.g., files owned by the business entity). There may be many devices, each running tens to hundreds of applications, which can be a mix of enterprise applications and non-enterprise applications, and it can therefore be very challenging to classify and filter network traffic that the group of networking assets engages in.

The techniques of this disclose provide a framework that can efficiently filter network traffic from each endpoint in real time based on an administrator's network policies. As explained below, these techniques provide easy customization of network policies and have a low memory footprint. The techniques described herein use deterministic finite automata to make fast, deterministic search and filtering decisions in real-time for a group of networking assets. The network traffic may include one-off requests (e.g., a request by a browser to access webpage) or requests that involve streaming content (e.g., video frames).

Figure 1:
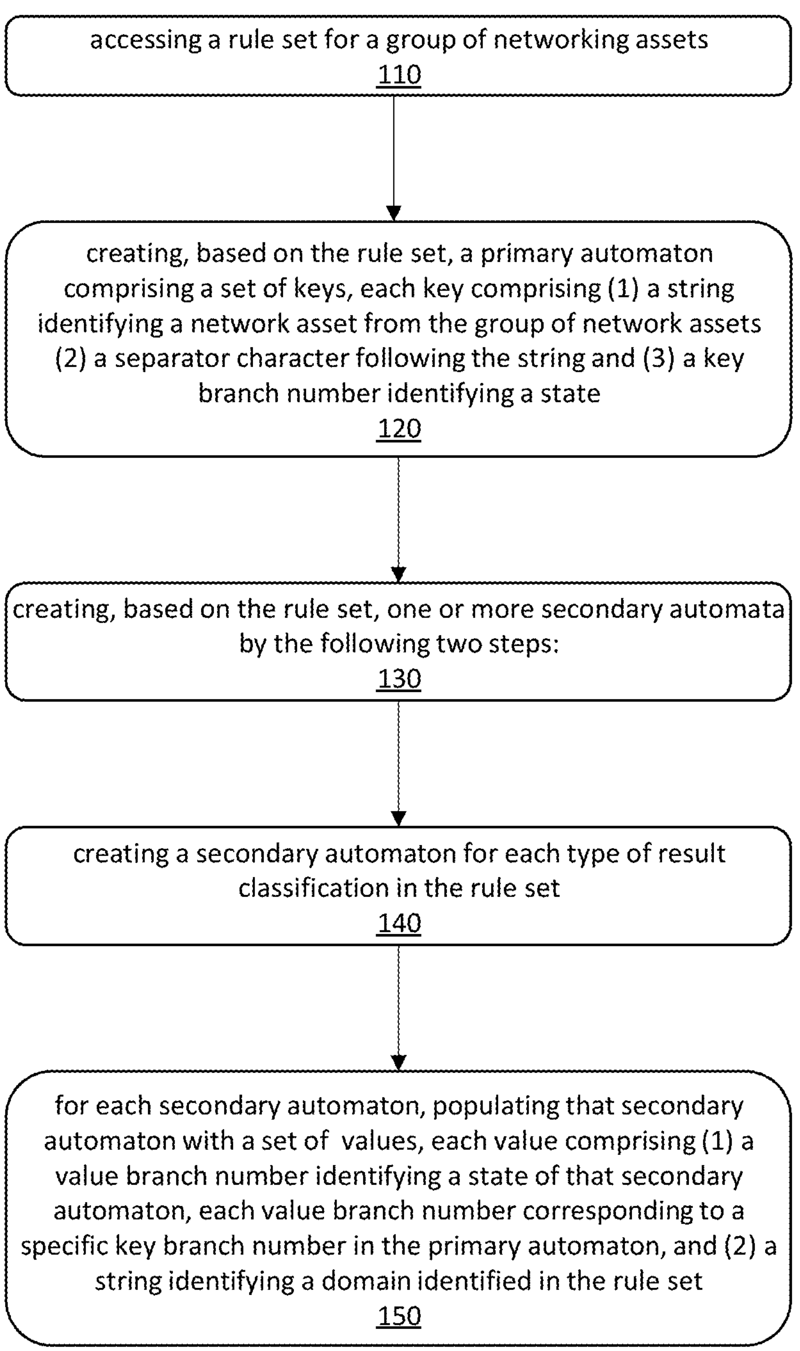
FIG. 1 illustrates an example method for generating the network filtering and classifying system.

FIG. 1 illustrates an example method for generating the network filtering and classifying system. Step 110 of the example method of FIG. 1 includes accessing a rule set for a group of networking assets. The rule set includes one or more rules (and often can include many rules) that specify what domain(s) one or more networking assets can access or are prohibited from accessing. As explained herein, a rule in the rule set may specifically identify a networking asset (e.g., an application, or a specific device) that can access or not access a specific domain (e.g., a specific website or a specific network device). A rule in the rule set may apply to a group of devices (e.g., all devices), and may provide access policies for a group of domains (e.g., a set of webpages associated with a particular domain).

Figure 2:
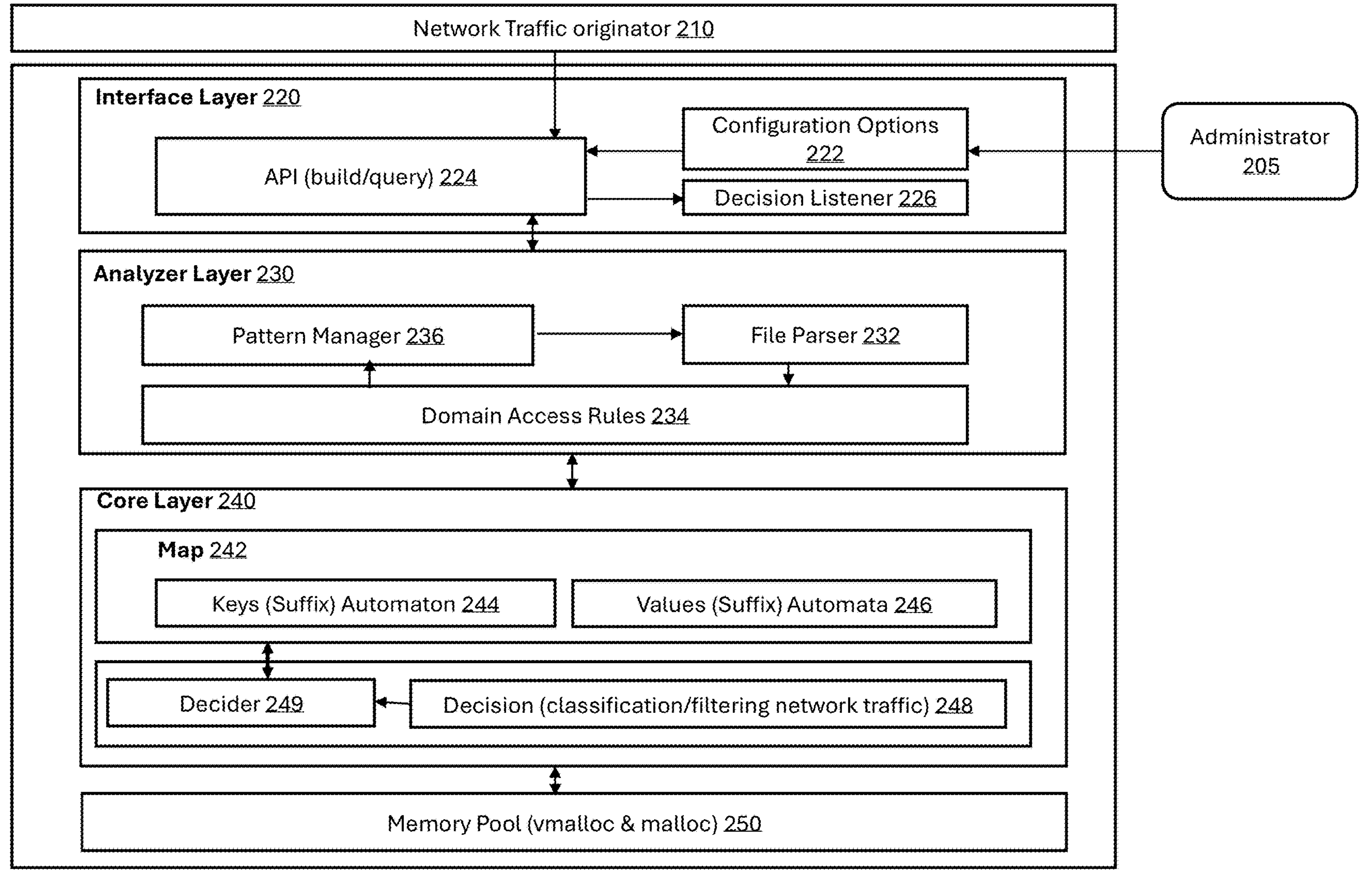
FIG. 2 illustrates an example architecture for performing an example implementation of the methods of FIG. 1 and FIG. 4.
Figure 4:
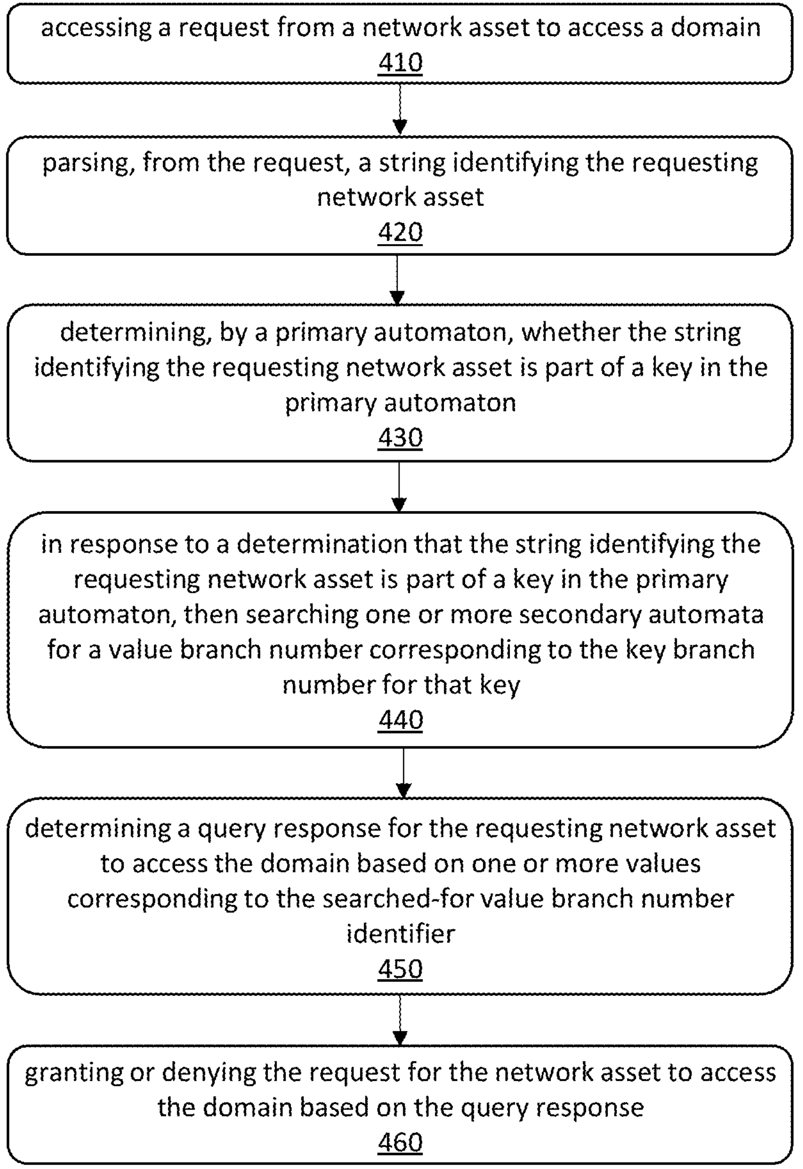
FIG. 4 illustrates an example of a query job.

FIG. 2 illustrates an example architecture for performing an example implementation of the methods of FIG. 1 and FIG. 4. The example architecture of FIG. 2 includes a network traffic originator 210, which is a network asset that generates some network traffic. Network traffic originator 210 may be an endpoint such as a mobile device, etc., or may be a specific application running on a network device. Interface layer 220, analyzer layer 230, and core layer 240 in the example architecture of FIG. 2 providing networking filtering functionality. In particular embodiments, these components may be deployed on each endpoint device (e.g., may filter that particular endpoint's network traffic). In particular embodiments, these components may be deployed on, e.g., a server device for managing network traffic from endpoint devices.

An administrator 205 can create and update configuration options 222 for network assets in the network managed by the administrator. In particular embodiments, administrator 205 can includes multiple administrators; in essence, an administrator is an individual or entity who is authorized to write to configurations options 222. Configurations options 222 specify the rules that manage network traffic from the group of network assets. These rules can be implemented through a user interface that can be accessed by administrator 205, and writes made by the administrator can be pushed to network assets in the network, so that each networking asset stores a copy of the rule set.

In particular embodiments, configuration options 222 may be specified by JSON constructs, i.e., an array of rules. Every rule is represented by a JSON object. The full array of rules itself is represented by a JSON array. As explained below, the rules are provided in the mapping between a group of strings (keys) and the associated group of strings (values) using JSON-based proxy/stub communication protocols. Particular embodiments may use other formats, including but not limited to XML or YAML or CSV or Protocol Buffer (protobuf) or MessagePack or BSON (Binary JSON).

In the example architecture of FIG. 2, decision listener 226 provides notifications to a network traffic originator or to an administrator when the status of a read job (e.g., traffic filtering) or write job (e.g., updating the configuration options) changes, thereby avoiding unnecessary queries to the architecture to determine the status of a read or write job requested by a network traffic originator 210 or an administrator 205, respectively.

API 224 provides an application programming interface to handle read (query) and write (build) requests from network traffic originators and from network administrators, respectively. A "build" request takes as input the rule set (e.g., a JSON configuration), and a write request takes as input at least two strings: a string identifying the requesting network asset and string identifying the requested domain.

FIG. 1 illustrates an example of a build request. Upon accessing a rule set for a group of networking assets in step 110, step 120 includes creating, based on the rule set, a primary automaton that includes a set of keys. Each key includes (1) a string identifying a network asset from the group of network assets (2) a separator character following the string and (3) a key branch number identifying a state. In the example architecture of FIG. 2, a build request may be passed from interface layer 220 to analyzer layer 230. In the example of FIG. 2, analyzer layer 230 includers a file parser 232 (e.g., a JSON parser), which is responsible for parsing the rule set in the file format provided by the administrator. Doman access rules 234 create the access from the parsed file format. The access rules are provided to pattern manager 236, which builds the mapping memory from the (often huge) corpus of rule-set strings specified in configuration options 222. In particular embodiments, during a read job, pattern manager 236 may also ensure that multiple queries received simultaneously are properly handled.

Core layer 240 contains map 242, which makes use of automata to build the system in response to build requests. Map 242 includes key (suffix) automaton 244 and values (suffix) automaton 246. A suffix automation acts as an index of all sub-strings of a given string and has linear construction time and linear search time. Map 242 includes a mapping between the keys and the values. Keys automaton 244 contains key strings and value automaton(s) 246 contains the value strings, both of which are described below.

Decision block 248 applies the appropriate policies from configuration options 222 to a query access request. In particular embodiments, the decision may be "allow" or "deny," while in other embodiments decision outcomes may include other categories (e.g., conditional or temporary access grants, etc.). Decider 249 handles the query and makes the final decision on the query (e.g., by applying tiebreaking, etc.). Memory pool 250 is an abstraction on the underlying memory of the operation system of the computing device, and ensures that unnecessary fragmentation of memory does not occur when allocating memory for the corpus of strings.

Figure 3:
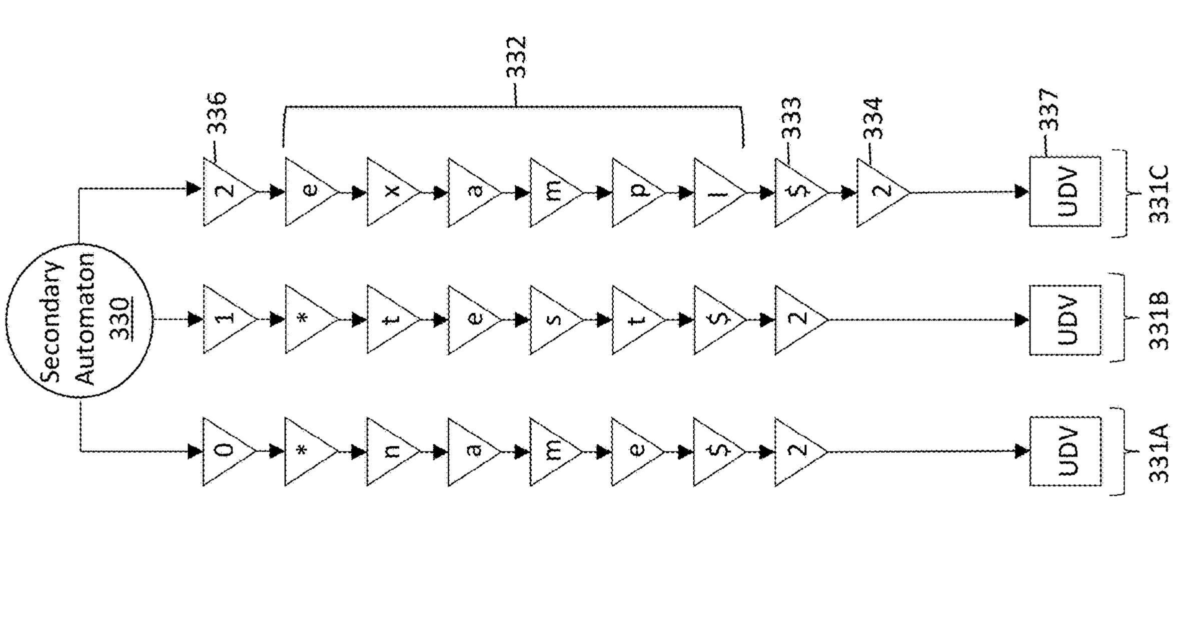
FIG. 3 illustrates an example of a single key automaton and two value automata.
Figure 3:
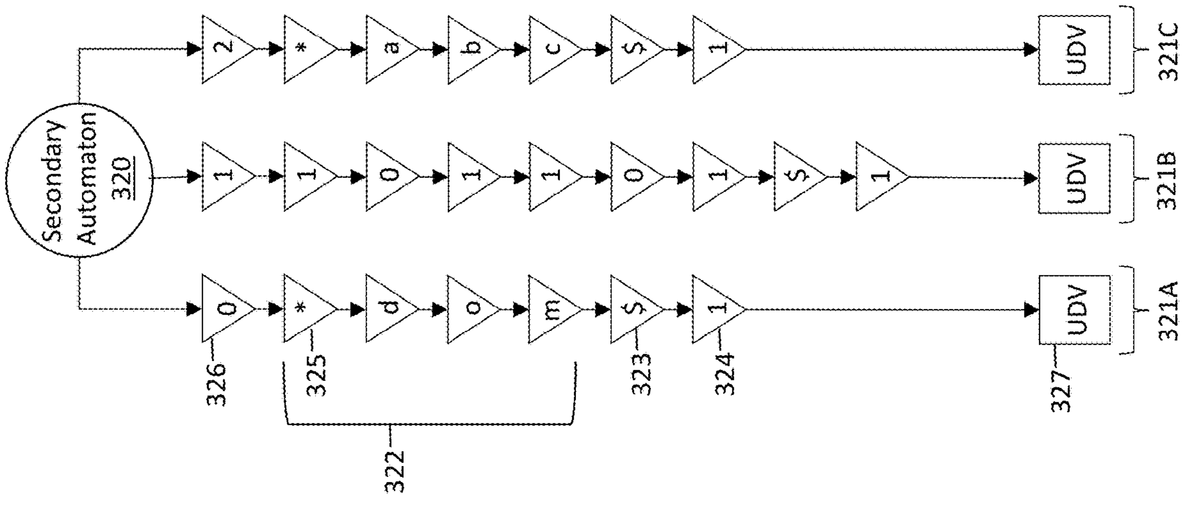
Figure 3:
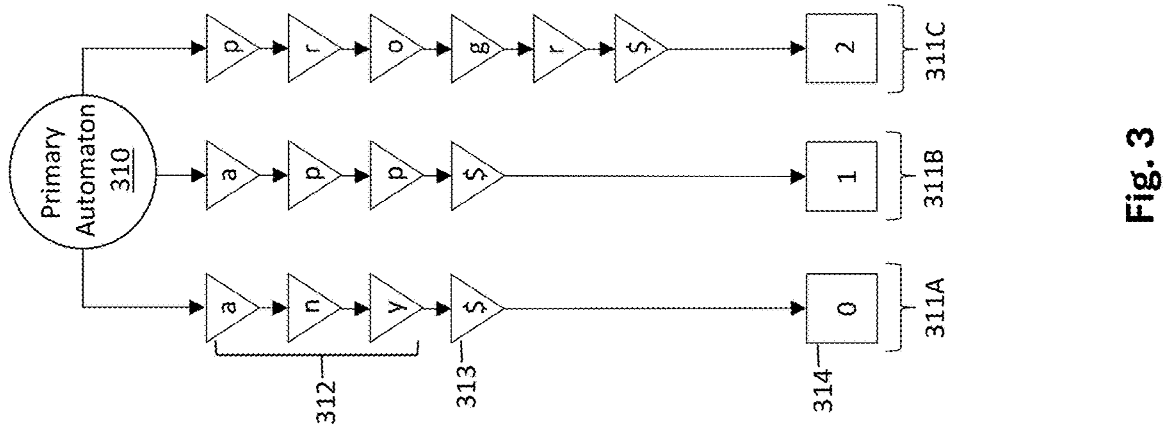

FIG. 3 illustrates an example of a key automaton and two value automatons. The example of FIG. 3 is based on the following example input from a rule set, which may be in JSON format:

```
[
{
  "allow": ["*doms"],
  "dont-allow": ["*name"]
},
{
  "asset": ["app"],
  "allowed-domains": ["45"],
  "not-allowed-domains": ["*test"]
},
{
  "asset": ["progr"],
  "allowed-domains": ["*abc"],
  "not-allowed-domains": ["exampl"]
}
]
```

This example illustrates three rules, but in practice there are typically many more rules for a group of networking assets. For the purposes of this example, the assets specified by the "assets" tag are illustrated using example strings (e.g., "app" and "progr"), but in practice these assets are identified by their network identifiers, e.g., by an application package name (such as "com.samsung.sbrowswer"). Likewise, in this example the domains are identified by example strings (e.g., "*name," "*abc," etc.), but in practice the domains would be identified by real domain names (e.g., by IP address, by URL (e.g., "example.com"), etc.).

In the build phase, core layer 240 creates a primary suffix automaton 310 and populates this automaton with keys derived from the accessed rule sets. The primary suffix automaton identifies the network assets specified in the accessed rule set. In the example of FIG. 3, primary automaton 310 identifies three example assets corresponding to the three keys 311A, 311B, and 311C. Each key includes a string identifying a network asset from the group of network assets. For example, string 312 "any" identifies all network assets in the group, as explained below. Likewise, string "app" corresponds to the asset identified by the "app" string in the example JSON above. The build phase also includes processing on the asset strings to create the keys for the primary automaton. For instance, key 311A in the example of FIG. 3 includes a separator character "$" following string 312, which separates the asset-identifying string from the additional key data. In general, the separator character may include multiple characters; a goal being to include characters that are not found in the assets-identifying strings. String 311A also includes a key branch number 314 that identifies a state for a secondary automaton, as described below. Thus, during the build phase in the example of FIG. 3, the core layer 240 accesses the rule set, creates a key for each identified network asset, and appends a separator character and a key branch number to the string identifying that asset. The build phase populates keys in primary automaton 310, and only a single primary automaton is used to hold the keys, in this example.

As illustrated in the example of FIG. 3, a primary automaton may include asset-identifying strings that are explicitly identified in the rule set (e.g. the "app" string). A primary automaton may also include strings that identify groups of assets, and these strings may or may not be specified in the rule set. For example, the string "any" refers to all assets in the group of network assets, and is specified by the absence of an "asset" tag in the first block of example JSON specified above. FIG. 3 also illustrates an example of wild-card characters (e.g., "*" character 325), which can be used to specify any number of characters. For instance, "*dom" means that any domain ending with "dom" corresponds to value 321A.

The build phase also includes creating one or more secondary automata. For instance, step 130 of the example method of FIG. 1 includes creating, based on the rule set, one or more secondary automata. The number of secondary automata used in any particular build is variable; step 140 includes creating a secondary automaton for each type of result classification in the rule set. The types of result classifications are the decision outcomes or classifications that can result from a query request. For instance, the example of FIG. 3 illustrates two secondary automata, one of which corresponds to the "allow" outcome and one of which corresponds to the "deny" outcome. Other embodiments may include more types of result classifications, and therefore would include more secondary automata.

Step 150 of the example method of FIG. 1 includes for each secondary automaton, populating that secondary automaton with a set of values. The example of FIG. 3 includes two secondary automata: secondary automaton 320 and secondary automaton 330. Each secondary automaton is populated with values, illustrated by values 321A, 321B, 321C, 322A, 322B, and 322C. Each value includes (1) a value branch number identifying a state of that secondary automaton. For example, value branch number 326 corresponds to a state (0) of secondary automaton 320. Each value branch number corresponds to a specific key branch number in the primary automaton, e.g., value branch number 326 corresponds to key branch number 314. As a result, when the primary automaton identifies a key that corresponds to a particular access request, the flow moves to the state in a secondary automaton identified by that key's key branch number. Then, as explained more fully below, each secondary automaton is searched for the corresponding value branch number, which is represented as an automaton state. In general, the automata are deterministic, in that they change state only when the next searched-for state exists.

In the example of FIG. 3, each value also includes a string identifying a domain identified in the rule set. For instance, string 322 and string 332 correspond to domains identified in the example JSON rule set above. Secondary automaton 320 corresponds to domains in the "allow" category identified in the rule set, and secondary automaton 330 corresponds to domains in the "not allowed" category.

As illustrated in the example of FIG. 3, values in the secondary automata may include a separator character (e.g., characters 323 and 333) following each string, and may include a secondary automaton identifier label (e.g., labels 324 and 334) following the separator character. These labels identify the secondary automaton that contains the found result corresponding to a particular key presented in a particular query. In particular embodiments, a value may include a user-defined value (e.g., UDVs 327 and 337), which are values specified by an administrator that can be surfaced after a value is found, which may be useful for debugging and to determine the operation of the system.

Among other things, the use of automata and keys/values containing appended strings provides efficient, deterministic search and avoids the need to break up strings, which avoids fragmentation in memory.

FIG. 4 illustrates an example of a query job. Step 410 includes accessing a request from a network asset to access a domain. For instance, step 410 can include receiving a request from a network traffic originator (e.g., an app) 210. The request includes at least two strings: (1) a string identifying the requesting asset and (2) a string identifying the domain that the network assets requests access to. Step 420 of the example method of FIG. 4 includes parsing, from the request, a string identifying the requesting network asset. As explained below, the string will be used by the primary automaton. The request may be made when, for example, a user open a browser on their smartphone, which is a network asset, and types in a URL identifying a particular domain (e.g., www.example.com/somepage). The domain "example.com" is then parsed from the URL and, in particular embodiments, a unique identifier of the requesting network asset (here, the browser application) is also retrieved. The unique identifier may be, for example, an application package name. These inputs may be passed to API 224 of the example architecture of FIG. 2, for example as an "api.get ("uniqueID", "example.com")" call. The interface layer (or another layer) can sanitize the input, e.g., by changing all uppercase to lowercase. The sanitized input is then passed to pattern manager 230, which performs housekeeping (e.g., ensuring that the system is not low on memory). The pattern manager then hands the request to the map entity, which creates the local-decision making entity (decider 249). In particular embodiments, decider 249 then implements the steps below.

Step 430 of the example method of FIG. 4 includes determining, by a primary automaton, whether the string identifying the requesting network asset is part of a key in the primary automaton. As described above, during the build phase the primary automaton is populated with keys that include strings identifying network assets from the rule set. The automaton treats each character in a key as a state, i.e., each state transition requires searching for, finding, and then moving to the next character is a searched-for string. For example, if a network asset string is "app," then the search would begin by looking for keys in the primary automaton that start with "a." For instance, in the example of FIG. 3, both the keys corresponding to "any" and "app" would satisfy this step. The automaton would then search for the next state "p," and the process would continue until the requesting network asset is either identified or is not found. If the string is not found, then a default key branch number may be used.

In particular embodiments, if multiple instances of the same networking asset are identified in a rule set, then each instance may correspond to a different key in the primary automaton. Each instance key would be given a different key branch number. Then, during query phase, each instance would be identified, and the process would move to the corresponding values identified by the various key branch numbers. In other embodiments, each networking asset may be identified by a single key, which may be associated with multiple key branch numbers, each pointing to different values in one or more secondary automata.

Step 440 of the example method of FIG. 4 includes in response to a determination that the string identifying the requesting network asset is part of a key in the primary automaton, then searching one or more secondary automata for a value branch number corresponding to the key branch number for that key. For instance, in the example of FIG. 3, key 311B corresponding to network asset "app" includes a key branch number "1". Thus, when the "app" string is found (after a state-by-state search) in the primary automaton, then state "1" is searched for in secondary automata 320 and 330. In particular embodiments, a key's key branch number may point to a corresponding value branch number in secondary automata.

Decider 249 may keep track of all the lookups in secondary automata in a local context object. Decider 249 may check all the secondary automata in a linear fashion to see if any of those automata has a transition to the given key branch number from the starting state of those secondary automata. If the first secondary automata does not have transition to the key branch number, decider 249 notes this in its local context.

Step 450 of the example method of FIG. 4 includes determining a query response for the requesting network asset to access the domain based on one or more values corresponding to the searched-for value branch number identifier. For instance, in the example of FIG. 3, starting at branch number 1 in secondary automaton 320 and secondary automaton 330, each secondary automaton searches for the next state, i.e., the first character of the domain that the network assets requests access to. Secondary automata may be searched sequentially or in parallel. If a value in a secondary automaton contains a string identifying the requested domain, then the query response is based on a classification type of the automata, e.g., if secondary automaton 320 corresponding to "allow" contains a value including a string that identifies the requested domain, then the query response will be allowed. If multiple secondary automata contain values that include the domain, then after all the secondary automata are searched, a decider may apply tie-breaks, which can be configured via input configurations to the system. The query response may be determined by decider 249 in the example embodiment of FIG. 2. In step 460, the request by the networking asset to access the particular domain is either granted or denied.

In particular embodiments, a cache may be used to increase search efficiency. For instance, if a particular network asset (e.g., a particular application) request access to a particular website, the query result may be stored in a cache. Each time a request is received, then the cache may be searched before using the method of FIG. 4. If the same asset subsequently requests access to the same domain, then the cached result will be immediately accessed and used to grant or deny the request. If the cache does not contain the appropriate query result, then the method of FIG. 4 is used. In particular embodiments, the cache may be deleted each time a build request occurs, e.g., each time the rule set is updated. When this occurs, the build process begins, and once the new primary and secondary automata are built, then the older build is replaced with the new build based on the updated rule set. Queries that arrive during the replacement process may be queued and then serviced once the new build is fully operational. In particular embodiment, the cache may be an LRU cache that resides in core automata layer.

In particular embodiments, a build phase may involve converting the identification of a domain into another format. For example, a domain identified in a rule set may by an IP address, e.g., "192.168.30.12/27." Particular embodiments may convert this IP address to binary. In particular embodiments, only the first 27 digits of the binary IP address may be needed, per the classless inter-domain routing format. This binary number made be stored in the secondary automata as the string identifying the domain identified in the rule set by an IP address. During the query phase, if a network asset (e.g., an application) requests access to an IP address, the system may first search for the IP address (with some sanitization, in particular embodiments, such as padding each entry in the IP address with 0's so that each entry contains three numbers). If that search fails, then the padded IP address may be converted to binary, and the first 27 characters may be used to perform the search.

Any suitable programming language may be used for implementing the techniques described herein, such as C++ or Java. In particular embodiments, C++ or a similar language may provide superior performance during both the build and query phases.

While the examples above relate to controlling network traffic, the techniques described herein may also be used for other search-related functionality. For example, the techniques described herein may be used as a user-side network packet filtering system, or may be used as a kernel-side system extension for filtering allowed/not-allowed list in Kernel Loadable Module in Linux/Android or in System Extension in MacOS/iOS to apply specific policies via a kernel-level access manager. As another example, the techniques described herein may be used as a search system for fetching search results among a large collection of multiple patterns in device management administrative purposes and also to apply policies based on the search results with acceptance/rejection semantics paradigm. Finally, the techniques described herein may be used for efficient search of a large corpus of strings; for example, in computational biology like clustered regularly inter-spaced palindromic repeats (CRISPR) for quickly generating single guide RNA (sgRNAs) and finding their target sites in DNA sequences (e.g., to find the specific protein sequence at which a certain cut should made).

Figure 5:
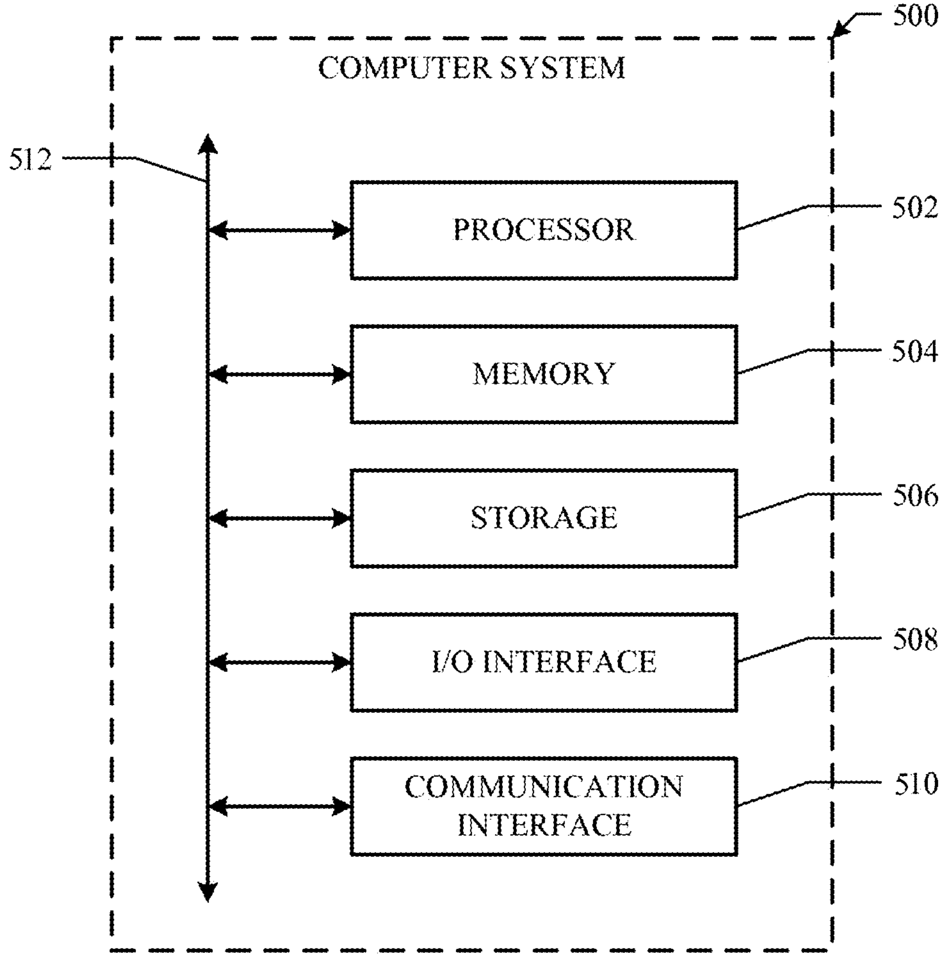
FIG. 5 illustrates an example computing system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

accessing a rule set for a group of networking assets;

creating, based on the rule set, a primary automaton comprising a set of keys, each key comprising (1) a string identifying a network asset from the group of network assets (2) a separator character following the string and (3) a key branch number identifying a state; and creating, based on the rule set, one or more secondary automata, comprising:

creating a secondary automaton for each type of result classification in the rule set; and for each secondary automaton, populating that secondary automaton with a set of values, each value comprising (1) a value branch number identifying a state of that secondary automaton, each value branch number corresponding to a specific key branch number in the primary automaton, and (2) a string identifying a domain identified in the rule set.

2. The method of claim 1, wherein each secondary automaton value further comprises (3) a separator character following the string identifying the domain and (4) a secondary automaton identifier label following the separator character.

3. The method of claim 1, further comprising:

accessing an updated rule set for the group of networking assets;

creating a new primary automaton and one or more new secondary automatons based on the updated rule set; and replacing the primary automaton and the one or more secondary automatons with the new primary automaton and the one or more new secondary automatons, respectively.

4. The method of claim 3, further comprising clearing, in response to the updated rule set, a cache comprising an identification of (1) previously queried domain requests from particular network assets and (2) for each request, a corresponding request decision.

5. The method of claim 1, wherein the group of network assets comprises a group of software applications.

6. The method of claim 1, wherein the types of result classifications comprise (1) a result allowing a network asset to access a domain and (2) a result prohibiting a network asset from accessing a domain.

7. The method of claim 6, wherein each domain comprises an identification of a network address.

8. The method of claim 1, wherein the primary automaton further comprises a virtual key comprising a string identifying a virtual network asset that corresponds to all network assets in the group of network assets.

9. One or more non-transitory computer readable storage media storing instructions that are operable when executed to:

access a rule set for a group of networking assets;

create, based on the rule set, a primary automaton comprising a set of keys, each key comprising (1) a string identifying a network asset from the group of network assets (2) a separator character following the string and (3) a key branch number identifying a state; and create, based on the rule set, one or more secondary automata, comprising:

create a secondary automaton for each type of result classification in the rule set; and for each secondary automaton, populate that secondary automaton with a set of values, each value comprising (1) a value branch number identifying a state of that secondary automaton, each value branch number corresponding to a specific key branch number in the primary automaton, and (2) a string identifying a domain identified in the rule set.

10. The media of claim 9, wherein each secondary automaton value further comprises (3) a separator character following the string identifying the domain and (4) a secondary automaton identifier label following the separator character.

11. The media of claim 9, wherein the instructions are further operable when executed to:

access an updated rule set for the group of networking assets;

create a new primary automaton and one or more new secondary automatons based on the updated rule set; and replace the primary automaton and the one or more secondary automatons with the new primary automaton and the one or more new secondary automatons, respectively.

12. The media of claim 11, wherein the instructions are further operable when executed to clear, in response to the updated rule set, a cache comprising an identification of (1) previously queried domain requests from particular network assets and (2) for each request, a corresponding request decision.

13. The media of claim 9, wherein the group of network assets comprises a group of software applications.

14. The media of claim 9, wherein the types of result classifications comprise (1) a result allowing a network asset to access a domain and (2) a result prohibiting a network asset from accessing a domain.

15. The media of claim 14, wherein each domain comprises an identification of a network address.

16. A method comprising:

accessing a request from a network asset to access a domain;

parsing, from the request, a string identifying the requesting network asset;

determining, by a primary automaton, whether the string identifying the requesting network asset is part of a key in the primary automaton, wherein each key in the primary automaton comprises (1) a string identifying a network asset from the group of network assets (2) a separator character following the string and (3) a key branch number identifying a state;

in response to a determination that the string identifying the requesting network asset is part of a key in the primary automaton, then searching one or more secondary automata for a value branch number corresponding to the key branch number for that key, wherein each secondary automaton contains values, each value comprising (1) a value branch number identifying a state of that secondary automaton, each value branch number corresponding to a specific key branch number in the primary automaton, and (2) a string identifying a domain identified in the rule set;

determining a query response for the requesting network asset to access the domain based on one or more values corresponding to the searched-for value branch number identifier; and granting or denying the request for the network asset to access the domain based on the query response.

17. The method of claim 16, wherein the network asset comprises an application executed on a client device.

18. The method of claim 17, wherein the client device executes the method of claim 16.

19. The method of claim 16, wherein the domain comprises an identification of a network address.

20. The method of claim 16, wherein each secondary automaton value further comprises (3) a separator character following the string identifying the domain and (4) a secondary automaton identifier label following the separator character.

* * * * *